(12) United States Patent
Yuan

(10) Patent No.: US 10,715,492 B2
(45) Date of Patent: Jul. 14, 2020

(54) FLOW TABLE PROCESSING METHOD AND APPARATUS

(71) Applicant: HUAWEI TECHNOLOGIES CO.,LTD., Shenzhen, Guangdong (CN)

(72) Inventor: Wei Yuan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

(21) Appl. No.: 16/125,330

(22) Filed: Sep. 7, 2018

(65) Prior Publication Data

US 2019/0020627 A1    Jan. 17, 2019

Related U.S. Application Data

(63) Continuation of application No. PCT/CN2016/075982, filed on Mar. 9, 2016.

(51) Int. Cl.
*H04L 29/06* (2006.01)
*H04L 12/715* (2013.01)
(Continued)

(52) U.S. Cl.
CPC ...... *H04L 63/0236* (2013.01); *G06F 9/45558* (2013.01); *H04L 45/38* (2013.01);
(Continued)

(58) Field of Classification Search
CPC ..... H04L 63/20; H04L 63/0236; H04L 45/38; H04L 45/64
See application file for complete search history.

(56) References Cited

U.S. PATENT DOCUMENTS

2014/0040613 A1   2/2014  Futagami et al.
2015/0124591 A1*  5/2015  Nakagawa .......... H04L 41/0659
                                                       370/225
(Continued)

FOREIGN PATENT DOCUMENTS

CN    102625184 A    8/2012
CN    103164647 A    6/2013
(Continued)

OTHER PUBLICATIONS

Greg Stabler et al:"Elastic IP and security groups implementation using Open Flow", Proceedings of the 6th International Workshop on Uirtualization Technologies in Distributed Computing Date, VTDC'12, Jan. 1, 2012, XP055236938, 8 pages.
(Continued)

*Primary Examiner* — Dao Q Ho
(74) *Attorney, Agent, or Firm* — James Anderson Harrison

(57) ABSTRACT

This application discloses a flow table processing method and the method is applicable to a software-defined networking SDN. After determining that M virtual machine ports are added to a security group, an SDN controller generates a first matching flow table set, a second matching flow table set, and an action flow table of the security group. The first matching flow table set and the second matching flow table set together implement matching of the security group. The action flow table of the security group includes a packet action for a packet that successfully matches the security group. The method provided in this application lowers complexity of a flow table used to implement security group matching, and improves security group matching efficiency.

5 Claims, 8 Drawing Sheets

Port matching flow table (packet egress direction):

table=$sg_egress_table, priority=$sgA_priority, in_port=$vm1_port, ct_state=+trk+new, actions=conjunction($sgA_conj_id, 1/2)

rule1: egress, ipv4, 22/tcp, remote_group:sgA

Rule matching flow table (packet egress direction):

table=$sg_egress_table, priority=$sgA_priority, ip, nw_proto=6, tcp_dst=22, nw_dst=$vm1_fixed_ip, actions=conjunction($sgA_conj_id, 2/2)

TO
FIG. 5B

(51) Int. Cl.
*H04L 12/741* (2013.01)
*H04L 12/721* (2013.01)
*G06F 9/455* (2018.01)

(52) U.S. Cl.
CPC .............. *H04L 45/54* (2013.01); *H04L 45/64* (2013.01); *H04L 45/745* (2013.01); *H04L 63/104* (2013.01); *G06F 2009/45587* (2013.01); *G06F 2009/45595* (2013.01)

(56) References Cited

U.S. PATENT DOCUMENTS

| | | |
|---|---|---|
| 2015/0139238 A1 | 5/2015 | Pourzandi et al. |
| 2015/0150087 A1 | 5/2015 | Palshikar et al. |
| 2016/0065618 A1 | 3/2016 | Banerjee et al. |
| 2016/0277297 A1 | 9/2016 | Chang |

FOREIGN PATENT DOCUMENTS

| | | |
|---|---|---|
| CN | 103581183 A | 2/2014 |
| CN | 104007997 A | 8/2014 |
| CN | 104394080 A | 3/2015 |
| CN | 104580027 A | 4/2015 |

OTHER PUBLICATIONS

Anonymous:Dragonflow Security Groups at Scale .GalSagie., Dec. 28, 2015, XP055442409, 12 pages.

\* cited by examiner

Port matching flow table (packet egress direction):
table=$sg_egress_table, priority=$sgA_priority, in_port=$vm1_port, ct_state=+trk+new, actions=conjunction($sgA_conj_id, 1/2)

rule1: egress, ipv4, 22/tcp, remote_group:sgA

Rule matching flow table (packet egress direction):
table=$sg_egress_table, priority=$sgA_priority, ip, nw_proto=6, tcp_dst=22, nw_dst=$vm1_fixed_ip, actions=conjunction($sgA_conj_id, 2/2)

CONT.
FROM
FIG. 5A
∼ rule2: egress, ipv4, icmp, remote_ip_prefix:192.168.1.0/24

Rule matching flow table (packet egress direction):
table=$sg_egress_table, priority=$sgA_priority, ip, nw_proto=1, nw_dst=192.168.1.0/24, actions=conjunction($sgA_conj_id, 2/2)

Action flow table 1 (packet egress direction):
table=$sg_egress_table, conj_id=$sgA_conj_id, actions=ct(commit, zone=NXM_NX_CT_ZONE[], table=$next_process_table)

Action flow table 2 (packet egress direction):
table=$sg_egress_table, conj_id=$sgX_conj_id, actions=ct(commit, zone=NXM_NX_CT_ZONE[], output:$of_port)

CONT.
FROM
FIG. 5B

Port matching flow table (packet ingress direction):
table=$sg_ingress_table, priority=$sgA_priority, tun_id=2000, dl_mac=11:22:33:44:55:66, ct_state=+trk+new, actions=conjunction($sgA_conj_id, 1/2)

rule3: ingress, ipv4, 53/udp, remote_ip_prefix:192.168.1.0/24

Rule flow table (packet ingress direction):
table=$sg_ingress_table, priority=$sgA_priority, ip, nw_proto=17, udp_dst=53, nw_src=192.168.1.0/24, actions=conjunction($sgA_conj_id, 2/2)

Action flow table (packet ingress direction):
table=$sg_ingress_table, conj_id=$sgA_conj_id, actions=ct(commit, zone=NXM_NX_CT_ZONE[], table=$ingress_next_process_table)

FIG. 5C

FLOW TABLE PROCESSING METHOD AND APPARATUS

CROSS-REFERENCE TO RELATED APPLICATIONS

This application is a continuation of International Application No. PCT/CN2016/075982, filed on Mar. 9, 2016, the disclosure of which is hereby incorporated by reference in its entirety.

TECHNICAL FIELD

This application relates to the field of computer technologies, and in particular, to a method, an apparatus, and a computing device for processing a flow table in a software-defined networking (English full name: software defined network, SDN for short), and a method, an apparatus, and a computing device for processing a packet.

BACKGROUND

In a cloud computing environment, there are complex multi-tenant scenarios and multiple tenants have different virtual machine (English full name: virtual machine, VM for short) policies for sending and receiving packets. To implement isolation between virtual machines, and to set a rule of sending and receiving a packet for the virtual machines according to a tenant's requirements, a rule of sending and receiving a packet by a virtual machine is specified by using a security group (English: security group).

A security group generally contains multiple packet sending and receiving rules. A security group in some cloud computing environments may have only packet sending rules or only packet receiving rules. In addition, multiple virtual machines may be added to each security group. Packets sent or received by the multiple virtual machines need to comply with rules in the security group. For example, a total of M virtual machines are added to a security group. The security group has N rules. In an existing SDN, to enable a packet sent by a virtual machine to match the N rules in the security group, an SDN controller needs to deliver a security group matching flow table. Each security group matching flow table delivered by the SDN controller includes at least two matching fields, and this leads to complex matching of the security group matching flow table.

SUMMARY

This application provides a flow table processing method, to improve security group matching efficiency.

According to a first aspect of this application, a flow table processing method is provided, including: An SDN controller receives a message that indicates that M virtual machine ports are added to a security group and is sent by a cloud computing management platform. The message carries identifiers of the M virtual machine ports and an identifier of the security group.

The SDN controller generates a first matching flow table set according to the identifier of the security group and the identifiers of the M virtual machine ports. The M virtual machine ports correspond to at least M port matching flow tables, each virtual machine port corresponds to at least one port matching flow table, and each port matching flow table includes port matching information and the identifier of the security group. The port matching information in each port matching flow table corresponds to one virtual machine port. Each virtual machine port may correspond to two port matching flow tables, that is port matching information in the two port matching flow tables may correspond to a same virtual machine port. The port matching information in each port matching flow table may be obtained according to an identifier of a virtual machine port.

The SDN controller obtains N rules included in the security group according to the identifier of the security group and generates a second matching flow table set. The second matching flow table set includes at least N rule matching flow tables corresponding to the N rules, each rule corresponds to at least one rule matching flow table, and each rule matching flow table includes rule matching information and the identifier of the security group. The rule matching information in each rule matching flow table corresponds to one rule. A quantity of rule matching flow tables corresponding to each rule varies with different rules in the security group. Each rule may correspond to multiple rule matching flow tables, that is, rule matching information in the multiple rule matching flow tables may correspond to a same rule.

The SDN controller generates an action flow table of the security group. The action flow table of the security group includes the identifier of the security group and a packet action. The action flow table is used to indicate: When a packet matches any port matching flow table in the first matching flow table set, and matches any rule matching flow table in the second matching flow table set, the packet action is executed on the packet.

The SDN controller sends the first matching flow table set, the second matching flow table set, and the action flow table of the security group to a switching device, so that the switching device processes the packet according to the flow tables. The first matching flow table set and the second matching flow table set are used to implement security group matching of the packet, and the action flow table is used to implement the packet action of the packet that successfully matches the security group. This reduces a quantity of matching fields of a flow table that the packet matches when the packet is matching the security group, lowers complexity of a security group matching process, and improves security group matching efficiency.

In addition, in the prior art, there are many flow tables due to a combination of at least two matching fields. For example, for a security group including M virtual machine ports and N rules, the SDN controller needs to generate at least M*N security group matching flow tables. A quantity of flow tables increases with an increase of M or N, and this decreases system running efficiency. Compared with the prior art, the solutions provided in this application decrease a quantity of flow tables that need to be generated, lighten load of generating flow tables by the SDN controller, lighten load of matching after the switching device receives a packet, and also reduce communication pressure on a communications network when the SDN controller sends the flow tables to the switching device. In addition, the decreased quantity of flow tables also reduce storage pressure of the switching device and therefore the switching device can process a more complex security group scenario.

With reference to the first aspect, in a first implementation manner of the first aspect, each port matching flow table further includes a first connection identifier. The first connection identifier is used to indicate that a first part of security group matching of the packet is completed when the packet matches any port matching flow table in the first matching flow table set. The first connection identifier may further be used to indicate that security group matching includes two parts. Each rule matching flow table further includes a second connection identifier. The second connection identifier is used to indicate that a second part of security group matching of the packet is completed when the packet matches any rule matching flow table in the second matching flow table set. The second connection identifier may further be used to indicate that security group matching includes two parts. Before processing the packet according to the packet action included in the action flow table of the security group, the switching device determines, according to the first connection identifier and the second connection identifier, that the packet successfully matches the security group.

The first connection identifier and the second connection identifier are used to associate the first matching flow table set with the second matching flow table set, so that the first matching flow table set and the second matching flow table set together implement matching of the security group.

With reference to the first aspect or the first implementation manner of the first aspect, in a second implementation manner of the first aspect, the SDN controller further receives a message indicating that a new virtual machine port is added to the security group. The new virtual machine port is a virtual machine port other than the M virtual machine ports and is an $(M+1)^{th}$ virtual machine port that is added to the security group. The message carries the identifier of the security group and an identifier of the new virtual machine port.

The SDN controller obtains port matching information of the new virtual machine port according to the identifier of the new virtual machine port.

The SDN controller generates a port matching flow table corresponding to the new virtual machine port. The port matching flow table corresponding to the new virtual machine port includes the port matching information of the new virtual machine port and the identifier of the security group. The SDN controller sends the port matching flow table corresponding to the new virtual machine port to the switching device.

Optionally, before generating the port matching flow table corresponding to the new virtual machine port, the SDN controller further needs to determine that the switching device has recorded the second matching flow table set, that is, determine the SDN controller has recorded an association relationship between the M virtual machine ports and the security group.

By means of the foregoing solutions, in a scenario in which a new virtual machine port is added to the security group, a process of generating a flow table and subsequent matching is simpler. This improves working efficiency of the SDN controller and matching efficiency of the switching device. In addition, the SDN controller only needs to generate a few flow tables and send them to the switching device, while in the prior art, the SDN controller needs to generate at least N flow tables in this scenario. Therefore, the technical solutions provided in this application lighten working load of the SDN controller and improve working efficiency of the SDN controller.

With reference to the first aspect or the first implementation manner of the first aspect, in a third implementation manner of the first aspect, the SDN controller receives a message indicating that a new rule is added to the security group. The new rule is a rule other than the N rules of the security group and is an $(N+1)^{th}$ rule of the security group.

The SDN controller generates a rule matching flow table corresponding to the new rule. The rule matching flow table corresponding to the new rule includes new rule matching information and the identifier of the security group. The new rule matching information corresponds to the new rule. The new rule matching information is generated by using the new rule, and the new rule may be carried in the message indicating that the new rule is added to the security group.

The SDN controller sends the rule matching flow table corresponding to the new rule to the switching device.

By means of the foregoing solutions, in a scenario in which a new rule is added to the security group, a process of generating a flow table and subsequent matching is simpler. This improves working efficiency of the SDN controller and matching efficiency of the switching device. In addition, the SDN controller only needs to generate a few flow tables and send them to the switching device, while in the prior art, the SDN controller needs to generate at least M flow tables in this scenario. Therefore, the technical solutions provided in this application lighten working load of the SDN controller and improve efficiency of adding a rule to the security group.

The second and the third implementation manners of the first aspect may be combined. That is, a new virtual machine port and a new rule are added to the security group. In this scenario, the SDN controller generates a port matching flow table corresponding to the new virtual machine port and a rule matching flow table corresponding to the new rule, and sends the port matching flow table and the rule matching flow table to the switching device.

With reference to any one of the first aspect or the foregoing implementation manners, in a fourth implementation manner of the first aspect, each port matching flow table and each rule matching flow table further include priority information of the security group.

In addition to being added to the security group, the M virtual machine ports further may belong to another security group. Packets sent by the M virtual machine ports may successfully match multiple security groups. In this case, if the port matching flow table and the rule matching flow table further include the priority information of the security group, it may be determined that a packet action in an action flow table corresponding to a security group with a highest priority is executed when the packets sent by the virtual machine ports belonging to the multiple security groups successfully match the multiple security groups.

With reference to any one of the first aspect or the foregoing implementation manners, in a fifth implementation manner of the first aspect, each port matching flow table further includes connection tracking (English: connection tracking) information. The connection tracking information indicates that a packet matching any port matching flow table belongs to a new session.

The security group provides access control with statuses. Therefore, if the packet does not belong to the new session, security group matching does not need to be performed, and the packet is processed directly according to a historical processing method of a session to which the packet belongs. The port matching flow table includes connection tracking information, so that the packet belonging only to the new session needs to match the first matching flow table set and the second matching flow table set.

With reference to any one of the first aspect or the foregoing implementation manners, in a sixth implementation manner of the first aspect, each port matching flow table, each rule matching flow table, and the action flow table of the security group further include direction information. The direction information indicates that the packet matching the first matching flow table set and the second matching flow table set is in an egress (English: egress) direction or an ingress (English: ingress) direction.

Packets received by the switching device have two directions: an egress direction in which a virtual machine port connected to the switching device sends a packet to the switching device, and an ingress direction in which the switching device sends a packet to the virtual machine port connected to the switching device. The switching device uses different processing processes for packets in different directions. Each port matching flow table, each rule matching flow table, and the action flow table of the security group record the direction information, and the packets in different directions match flow tables recording different direction information.

If rules included in the security group include a rule for a packet ingress direction and a packet egress direction, in any one of the first aspect or the implementation manners of the first aspect, the first matching flow table set generated by the SDN controller may include 2M port matching flow tables, and two action flow tables of the security group may be generated by the SDN controller. Considering that the packet direction needs to match the direction information in the flow tables, 2M port matching flow tables and two action flow tables need to be generated for the scenario in which the M virtual machine ports are added to the security group. Each virtual machine port corresponds to two port matching flow tables. Direction information in one port matching flow table indicates the packet egress direction and direction information in the other port matching flow table indicates the packet ingress direction. Each virtual machine port corresponds to two action flow tables. Direction information in one action flow table indicates the packet egress direction and direction information in the other action flow table indicates the packet ingress direction.

According to design of a cloud computing management platform, a security group in some cloud computing management platforms may have a rule of only a packet ingress direction or a packet egress direction. In this case, each port matching flow table, each rule matching flow table, and the action flow table of the security group may further include the direction information. The first matching flow table set generated by the SDN controller may include M port matching flow tables, and one action flow table of the security group may be generated by the SDN controller. That is, only a flow table in the packet ingress direction or the packet egress direction needs to be generated.

According to a second aspect of this application, a packet processing method is provided, including: A switching device receives a to-be-processed packet sent by a virtual machine.

The switching device matches the to-be-processed packet with security group matching information. The security group matching information includes the first matching flow table set, the second matching flow table set, and the action flow table of the security group that are generated by the SDN controller according to any one of the first aspect or the implementation manners of the first aspect.

The switching device determines the to-be-processed packet can match any port matching flow table in the first matching flow table set, and can match any rule matching flow table in the second matching flow table set, and then processes the to-be-processed packet according to a packet action in the action flow table of the security group.

Correspondingly, if the switching device determines that the to-be-processed packet does not match any flow table in the first matching flow table set or the second matching flow table set, the to-be-processed packet fails to match the security group.

After receiving the first matching flow table set and the second matching flow table set, and receiving the to-be-processed packet, the switching device matches the received to-be-processed packet only with a flow table in the first matching flow table set and a flow table in the second matching flow table set, so as to determine whether the to-be-processed packet successfully matches the security group. A quantity of matching fields in the matched flow table is smaller than that in the prior art. In addition, compared with the prior art that M*N flow tables need to be matched, the packet processing method reduces a quantity of flow tables that need to be matched, lightens working load of the switching device, and improves efficiency of matching a to-be-processed packet with a security group.

With reference to the second aspect, in a first implementation manner of the second aspect, before receiving the to-be-processed packet, the switching device further receives the security group matching information.

With reference to the second aspect or the first implementation manner of the second aspect, in a second implementation manner of the second aspect, the switching device receives the first matching flow table set and the second matching flow table set that are generated by the SDN controller according to the first implementation manner of the first aspect.

After determining that the to-be-processed packet matches any port matching flow table in the first matching flow table set, the switching device records a first connection identifier, and after determining that the to-be-processed packet matches any rule matching flow table in the second matching flow table set, the switching device records a second connection identifier. The first connection identifier and the second connection identifier may further indicate that security group matching includes two parts. Therefore, when the switching device determines, according to the recorded first connection identifier and second connection identifier, that the to-be-processed packet successfully matches the security group, the switching device processes the to-be-processed packet according to the packet action.

The switching device associates the first matching flow table set with the second matching flow table set by using the first connection identifier and the second connection identifier. This efficiently implements matching the to-be-processed packet with the security group.

According to a third aspect of this application, a flow table processing apparatus is provided. The flow table processing apparatus is configured to generate a flow table according to a message indicating that a virtual machine port is added to a security group, so that a switching device adds the virtual machine port to the security group according to an indication of the flow table. The flow table processing apparatus includes at least one module configured to execute the flow table processing method provided in any one of the first aspect or the implementation manners of the first aspect.

According to a fourth aspect of this application, a packet processing apparatus is provided. The packet processing apparatus is configured to receive a flow table sent by an SDN controller, and process a received to-be-processed packet according to an indication of the flow table. The packet processing apparatus includes at least one module configured to execute the packet processing method provided in any one of the second aspect or the implementation manners of the second aspect.

According to a fifth aspect of this application, a computing device is provided. The computing device may be a network node in an SDN architecture. Software used to implement an SDN controller may run on the computing device, so that the computing device can implement functions of the SDN controller. When the computing device is running, it executes the flow table processing method provided in any one of the first aspect or the implementation manners of the first aspect.

According to a sixth aspect of this application, a computing device is provided. The computing device may be a computing node in an SDN architecture. Software used to implement a switching device may run on the computing device, so that the computing device can implement functions of the switching device. When the computing device is running, it executes the packet processing method provided in any one of the second aspect or the implementation manners of the second aspect.

According to a seventh aspect of this application, an SDN is provided. The SDN includes at least one computing device, according to the fifth aspect, serving as a network node in the SDN, and further includes at least one computing device, according to the sixth aspect, serving as a computing node in the SDN. The computing node provided in the fifth aspect establishes a communications network with the computing node provided in the sixth aspect.

According to an eighth aspect of this application, a storage medium is provided. The storage medium stores program code. When the program code is run by a computing device, the computing device executes the flow table processing method provided in any one of the first aspect or the implementation manners of the first aspect. The storage medium includes but is not limited to a flash memory (English: flash memory), a hard disk drive (English: hard disk drive, HDD for short), or a solid-state drive (English: solid state drive, SSD for short).

According to a ninth aspect of this application, a storage medium is provided. The storage medium stores program code. When the program code is run by a computing device, the computing device executes the packet processing method provided in any one of the second aspect or the implementation manners of the second aspect. The storage medium includes but is not limited to a flash memory, an HDD, or an SSD.

According to a tenth aspect of this application, program code is provided. The program code may be a software installation package. When the program code is run by a computing device, the computing device executes the flow table processing method provided in any one of the first aspect or the implementation manners of the first aspect.

According to an eleventh aspect of this application, program code is provided. The program code may be a software installation package. When the program code is run by a computing device, the computing device executes the flow table processing method provided in any one of the second aspect or the implementation manners of the second aspect.

According to a twelfth aspect of this application, a flow table processing method is provided, and the method includes the following content.

An SDN controller generates a third matching flow table set of a security group, and M virtual machines have been added to the security group. The third matching flow table set includes at least M virtual machine matching flow tables corresponding to the M virtual machines, each virtual machine corresponds to at least one virtual machine matching flow table, each virtual machine matching flow table includes virtual machine matching information and an identifier of the security group, and M is an integer greater than 0.

The SDN controller generates a fourth matching flow table set. The security group includes N rules, the fourth matching flow table set includes at least N rule matching flow tables corresponding to the N rules, each rule corresponds to at least one rule matching flow table, each rule matching flow table includes rule matching information and the identifier of the security group, and N is an integer greater than 0.

The SDN controller generates an action flow table of the security group. The action flow table of the security group includes the identifier of the security group and a packet action, and the packet action indicates an operation that is executed after a packet successfully matches the security group. That a packet successfully matches the security group includes: The packet matches any virtual machine matching flow table in the third matching flow table set, and matches any rule matching flow table in the fourth matching flow table set.

The SDN controller sends the third matching flow table set, the fourth matching flow table set, and the action flow table of the security group to a switching device.

The virtual machine matching information may be an identifier or other information of a virtual machine, and can be used to distinguish different virtual machines.

Different from the flow table processing method provided in the first aspect of this application, in this flow table processing method, the SDN controller may receive a message indicating that a virtual machine is added to a security group. Then, the SDN controller adds virtual machine matching information to a virtual machine matching flow table. After the switching device that receives the third matching flow table set obtains a to-be-processed packet, the switching device determines a virtual machine to which the to-be-processed packet belongs, obtains virtual machine matching information of the virtual machine to which the to-be-processed packet belongs, and matches the to-be-processed packet with a flow table in the third matching flow table set according to the virtual machine matching information of the virtual machine to which the to-be-processed packet belongs.

For other implementation manners of the flow table processing method provided in the twelfth aspect, refer to the implementation manners of the flow table processing method provided in the first aspect.

According to a thirteenth aspect of this application, a flow table processing method is provided, and the method includes the following content.

An SDN controller generates a fifth matching flow table set of a security group, and M subnets have been added to the security group. The fifth matching flow table set includes at least M subnet matching flow tables corresponding to the M subnets, each subnet corresponds to at least one subnet matching flow table, each subnet matching flow table includes subnet matching information and an identifier of the security group, and M is an integer greater than 0.

The SDN controller generates a sixth matching flow table set. The security group includes N rules, the sixth matching flow table set includes at least N rule matching flow tables corresponding to the N rules, each rule corresponds to at least one rule matching flow table, each rule matching flow table includes rule matching information and the identifier of the security group, and N is an integer greater than 0.

The SDN controller generates an action flow table of the security group. The action flow table of the security group includes the identifier of the security group and a packet action, and the packet action indicates an operation that is executed after a packet successfully matches the security group. That a packet successfully matches the security group includes: The packet matches any virtual machine matching flow table in the fifth matching flow table set, and matches any rule matching flow table in the sixth matching flow table set.

The SDN controller sends the fifth matching flow table set, the sixth matching flow table set, and the action flow table of the security group to a switching device.

The subnet matching information may be an identifier or other information, such as a network address and a mask, of a subnet, and can be used to distinguish different subnets.

Different from the flow table processing method provided in the first aspect of this application, in this flow table processing method, the SDN controller may receive a message indicating that a subnet is added to a security group. Then, the SDN controller adds subnet matching information to a subnet matching flow table. After the switching device that receives the fifth matching flow table set obtains a to-be-processed packet, the switching device determines a subnet to which the to-be-processed packet belongs, obtains subnet matching information of the subnet to which the to-be-processed packet belongs, and matches the to-be-processed packet with a flow table in the fifth matching flow table set according to the subnet matching information of the subnet to which the to-be-processed packet belongs.

For other implementation manners of the flow table processing method provided in the thirteenth aspect, refer to the implementation manners of the flow table processing method provided in the first aspect.

BRIEF DESCRIPTION OF DRAWINGS

To describe the technical solutions in embodiments of this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

FIG. 5A and FIG. 5B and FIG. 5C are a schematic diagram of a flow table according to an embodiment of this application;

DESCRIPTION OF EMBODIMENTS

The following describes the technical solutions in embodiments of this application with reference to the accompanying drawings in the embodiments of this application.

Terms "first" and "second" are used in this application to distinguish objects, for example, a first matching flow table set, a second matching flow table set, and the like, but "first" and "second" are not logically or order dependent.

In this specification, a cloud computing management platform refers to a software platform that is used to deploy, manage, and configure a large quantity of virtual machines in a network and provides a cloud computing service to a user. The cloud computing management platform usually needs to support management of various mainstream virtual machine monitors (English full name: virtual machine monitor, VMM for short), and provides an application programming interface (English full name: application programming interface, API for short) to a user, to help the user perform VM migration, load balancing, flexible scaling, and other functions. Existing cloud computing management platforms include Eucalyptus, CloudStack, OpenNebula, Openstack, and the like.

In this specification, a flow table is used to control a data stream in an SDN, and may also be referred to as an SDN flow table. In the embodiments of this application, a flow table that complies with an OpenFlow protocol is used as an example. In actual practice, other flow tables that comply with other protocols may also be used.

In this specification, a switching device refers to a virtual switch (English full name: virtual switch). Common switching devices include an Open vSwitch, OVS for short. The OVS is a virtual switch provided in an open source project.

SDN Architecture Applicable to Embodiments of this Application

Figure 1A:
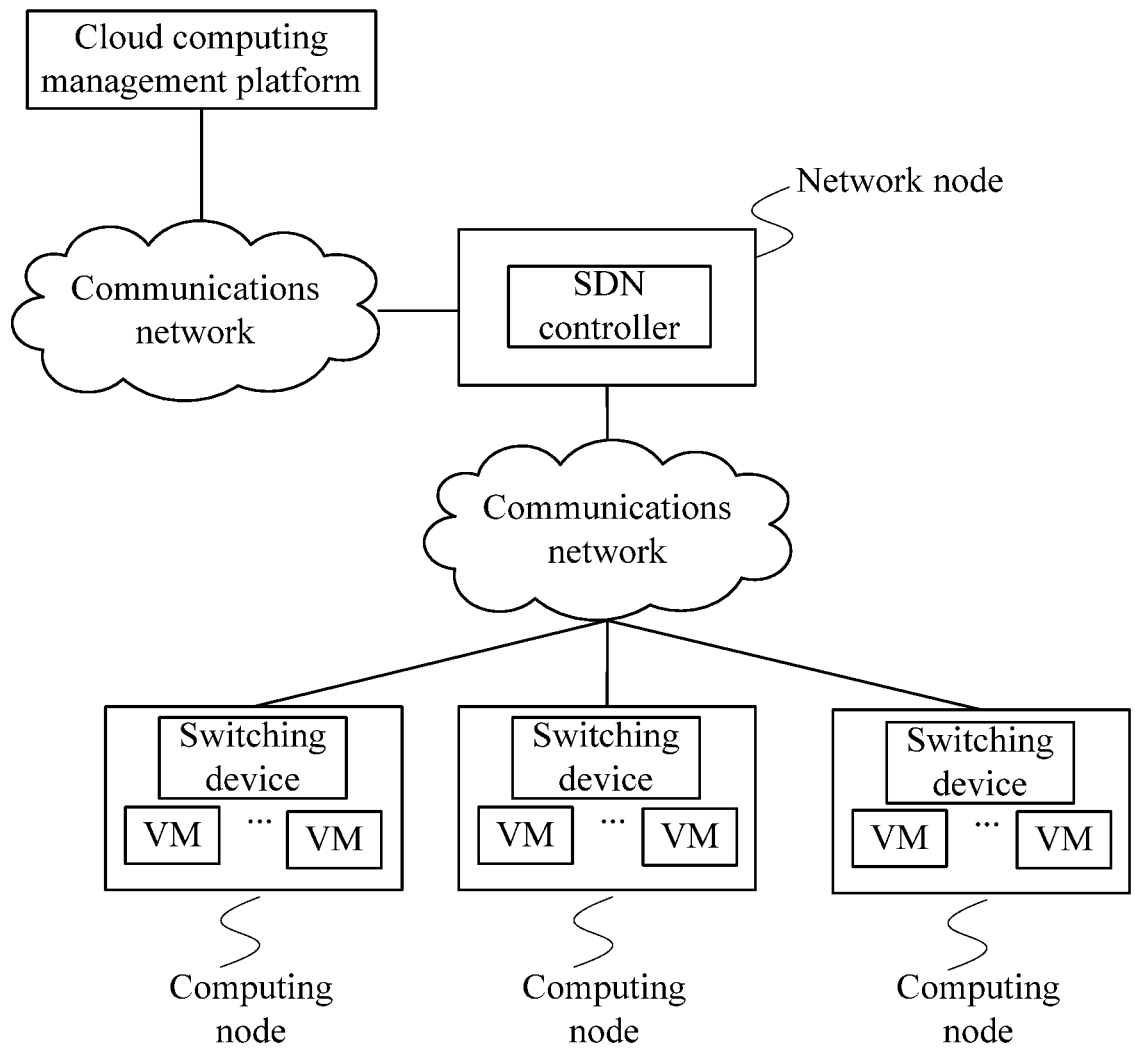
FIG. 1a to FIG. 1c are schematic diagrams of SDN architectures according to an embodiment of this application.

FIG. 1a is a schematic diagram of an SDN architecture applicable to an embodiment of this application. A cloud computing management platform receives an operation message sent by a user by using an API that the cloud computing management platform provides to the user. The operation message in this application includes adding a VM port to a security group, adding a rule to the security group, and the like. After obtaining the operation message, the cloud computing management platform instructs an SDN controller on a network node to generate a corresponding flow table. The SDN controller sends the flow table to a switching device on each computing node, so that the switching device can implement the user's operation message according to the flow table. The network node may not only be used to deploy the SDN controller, but also to deploy a module that is configured to perform network address translation (English full name: network address translation, NAT for short), load balancing, firewall, and other functions.

The computing node and network node in the SDN architecture in this application may be physical servers. A communications network between the cloud computing management platform and the network node, and a communications network between the network node and the computing node may be networks in a data center. The cloud computing management platform may also perform across-data center control, that is, control a network node in another data center.

Figure 1B:
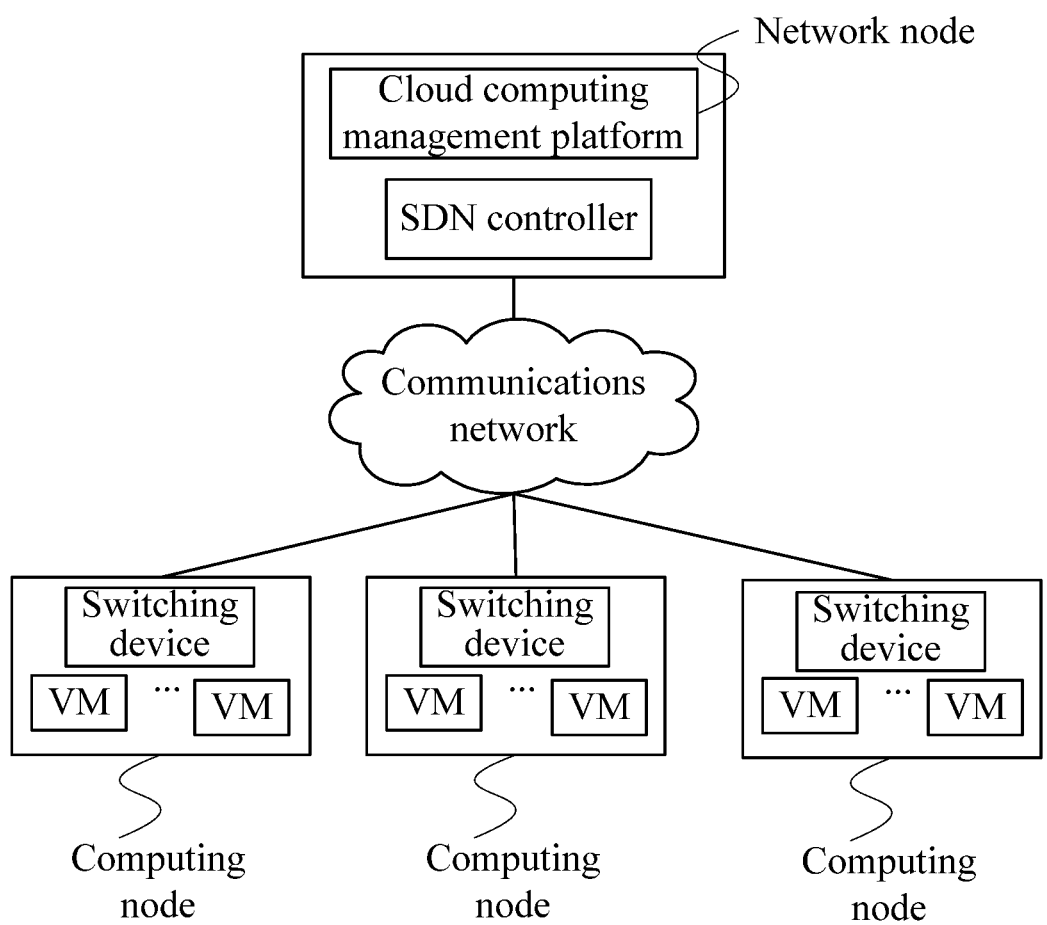

FIG. 1b is a schematic diagram of another SDN architecture applicable to an embodiment of this application. A difference between FIG. 1b and FIG. 1a is that a cloud computing management platform is deployed on a network node. For example, in a scenario of using an OpenStack cloud computing management platform, a newtron module of the OpenStack cloud computing management platform, configured to manage network configuration may be deployed on a network node.

Figure 1C:
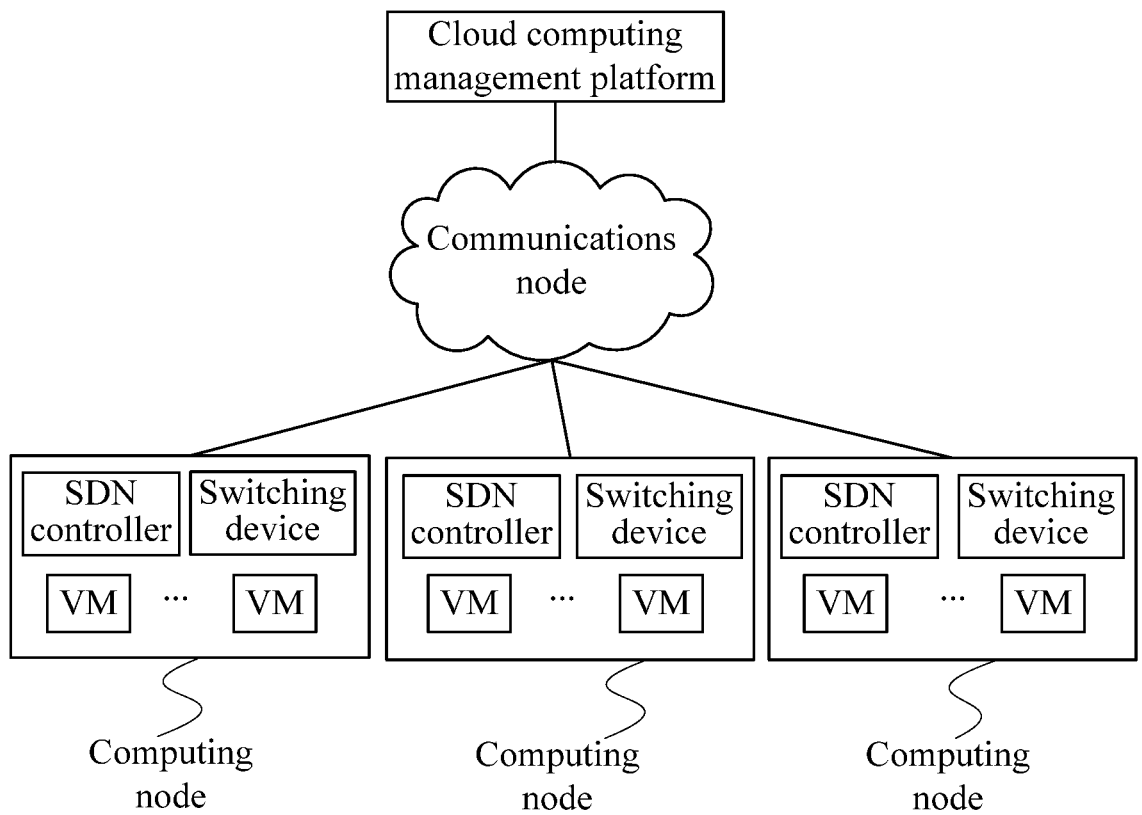

FIG. 1c is a schematic diagram of yet another SDN architecture applicable to an embodiment of this application. A difference between FIG. 1c and FIG. 1a and FIG. 1b is that a distributed SDN controller is used.

Figure 2:
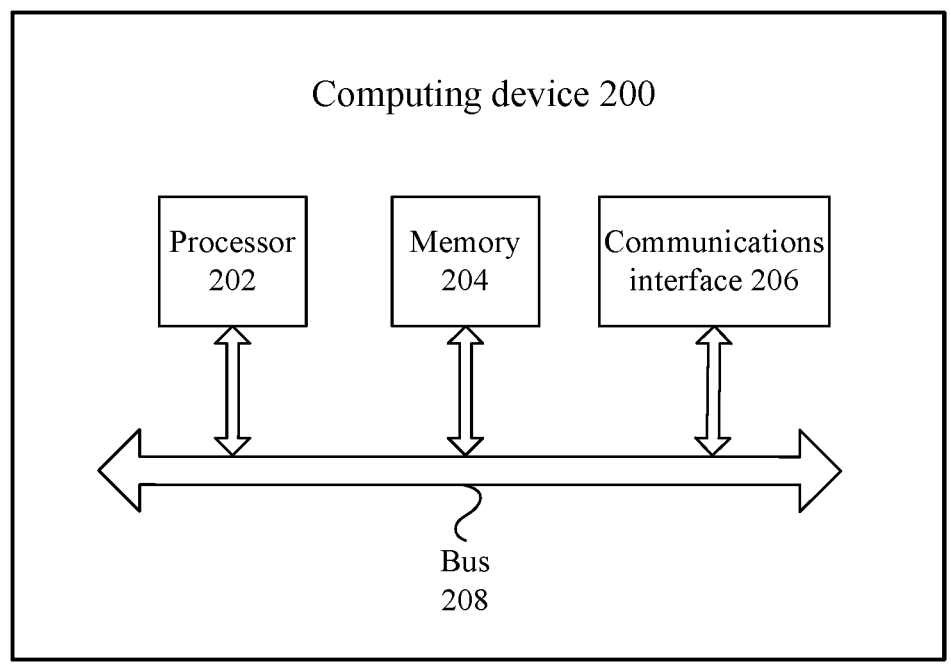
FIG. 2 is a schematic diagram of a composition structure of a computing device according to an embodiment of this application.

In FIG. 1a to FIG. 1c, a node on which the SDN controller is deployed may be implemented by a computing device 200. FIG. 2 shows a schematic diagram of a composition structure of the computing device 200. The computing device 200 includes a processor 202, a memory 204, and may further include a bus 208 and a communications interface 206.

The processor 202, the memory 204, and the communications interface 206 may be communicatively connected to each other by using the bus 208, or communicate by using other manners, such as wireless transmission.

The processor 202 may be a central processing unit (English: central processing unit, CPU for short).

The memory 204 may include a volatile memory (English: volatile memory), for example, a random access memory (English: random-access memory, RAM for short). The memory may also include a non-volatile memory (English: non-volatile memory), for example, a read-only memory (English: read-only memory, ROM for short), a flash memory, an HDD, or an SSD. The memory 204 may further include a combination of the foregoing types of memories. In a technical solution provided in this application is implemented by software, program code that implements a flow table processing method provided in FIG. 3 of this application is stored in the memory 204, and is executed by the processor 202. The computing device 200 communicates with other nodes in the SDN by using the communications interface 206.

In FIG. 1a to FIG. 1c, a node on which the switching device is deployed may also be implemented by the computing device 200. In a technical solution provided in this application is implemented by software, program code that implements a packet processing method provided in FIG. 4 of this application is stored in the memory 204, and is executed by the processor 202.

In an existing SDN, to enable a packet sent by a virtual machine port to match a security group, an SDN controller needs to deliver a security group matching flow table. Each security group matching flow table delivered by the SDN controller includes at least two matching fields. The at least two matching fields are respectively used to determine a security group to which the virtual machine port sending the packet belongs and determine whether the packet can match a rule in the security group. Therefore, matching of the security group matching flow table is complex. In addition, relatively many flow tables are required due to a combination of the at least two matching fields. For example, for a security group including M virtual machine ports and N rules, the SDN controller needs to deliver at least M*N security group matching flow tables. A quantity of flow tables increases with an increase of M or N. For the foregoing problems, a form of a security group matching flow table is changed in the embodiments of the present invention. A flow table for implementing security group matching is split into two parts: one is a port matching flow table used for matching a virtual machine port and the other is a rule matching flow table used for matching a rule in a security group. After the two parts of matching are completed, it is considered that a packet successfully matches the security group. In this case, the packet may execute a packet action indicated in an action flow table, that is, a third part. The port matching flow table, the rule matching flow table, or the action flow table has only one matching field in the embodiments of the present invention. Therefore, generating and matching of a flow table are simpler. On the other hand, the port matching flow table and the rule matching flow table used for matching are individually generated and do not need to be combined. If values of M and N are large, a total quantity of generated flow tables for matching is smaller than a quantity of flow tables in the prior art. For example, a quantity of generated flow tables for matching in the embodiments of the present invention is $M+N_1$ (N rules may generally correspond to N pieces of rule matching information, but in some cases, N rules may correspond to $N_1$ pieces of rule matching information), or is $2M+N_1$, whereas a quantity of generated flow tables for matching in the prior art is $M*N_1$.

Figure 3:
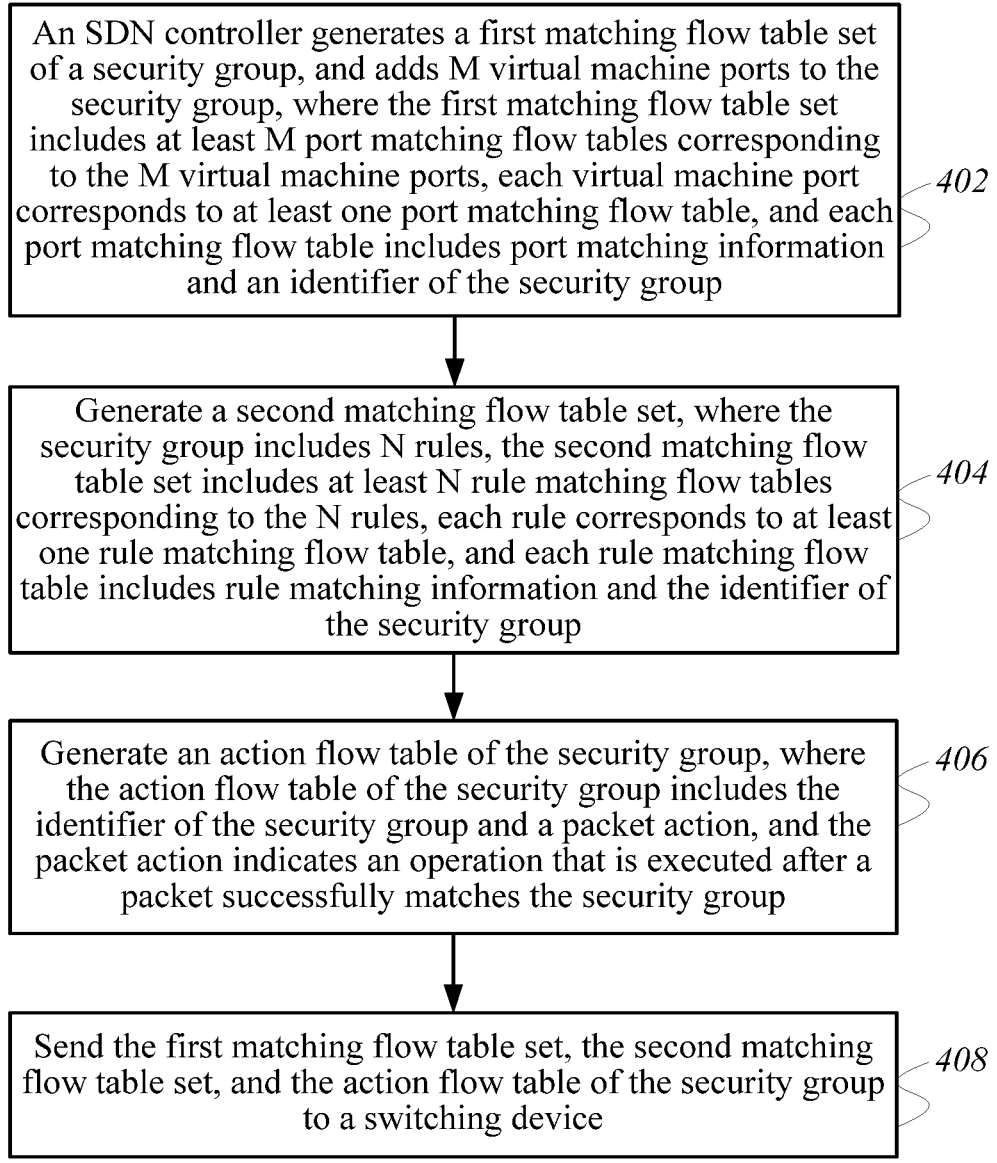
FIG. 3 is a schematic flowchart of a flow table processing method according to an embodiment of this application.

An embodiment of the present invention provides a flow table processing method. The flow table processing method is executed when a node on which an SDN controller is deployed in FIG. 1a to FIG. 1c is running. FIG. 3 shows a schematic flowchart of the flow table processing method.

Step 402: The SDN controller generates a first matching flow table set of a security group, and M virtual machine ports have been added to the security group, where the first matching flow table set includes at least M port matching flow tables corresponding to the M virtual machine ports, each virtual machine port corresponds to at least one port matching flow table, each port matching flow table includes port matching information and an identifier of the security group, and M is an integer greater than 0.

The SDN controller generates the first matching flow table set, and a flow table in the first matching flow table set is used for matching a virtual machine port, that is, for determining which security group a virtual machine port sending or receiving a packet belongs to.

Optionally, the SDN controller separately generates flow tables in the first matching flow table set according to a message indicating that the M virtual machine ports are added to the security group. The flow tables in the first matching flow table set are used for matching virtual machine port information.

A user sends a security group join message to a cloud computing management platform. The security group join message includes identifiers of the M virtual machine ports and the identifier of the security group. The M virtual machine ports indicate M different ports, and may belong to m virtual machines, where m<M. The cloud computing management platform sends the identifiers of the M virtual machine ports and the identifier of the security group to the SDN controller.

A format of the identifier of the security group specified in an API that the cloud computing management platform provides to the user may be inconsistent with a format of the identifier of the security group carried in a flow table that is subsequently generated by the SDN controller. Therefore, after receiving the identifier of the security group sent by the user, the cloud computing management platform or the SDN controller may convert, according to an actual requirement, the identifier into the identifier of the security group specified in a flow table design specification, to facilitate generation of a flow table.

In the security group join message sent by the user to the cloud computing management platform, the identifiers of the M virtual machine ports may be replaced with identifiers of one or more virtual machines or subnets. In this case, the cloud computing management platform or the SDN controller needs to obtain the identifiers of the corresponding virtual machine ports according to the identifiers of the one or more virtual machines or subnets. The user may add all virtual machine ports corresponding to the one or more virtual machines or subnets to the security group. Therefore, in this case the cloud computing management platform or the SDN controller further needs to convert the identifiers of the one or more virtual machines or subnets to obtain the identifiers of the corresponding virtual machine ports, or directly obtain port matching information of the corresponding virtual machine ports.

There are the following three optional scenarios for a quantity of port matching flow tables in the first matching flow table set:

Scenario 1: The security group includes only rules in a packet egress direction. Therefore, only M port matching flow tables in the egress direction need to be generated in the first matching flow table set. In this scenario, each port matching flow table optionally further includes direction information, and the direction information indicates the packet egress direction. Each port matching flow table in the egress direction includes the direction information, the identifier of the security group, and port matching information in the packet egress direction. Since the security group does not include rules in a packet ingress direction, packets in the ingress direction all pass through or are all discarded. The SDN controller further needs to generate a flow table used for allowing all packets in the ingress direction to pass through or for discarding the packets.

Scenario 2: The security group includes only rules in a packet ingress direction. Therefore, only M port matching flow tables in the ingress direction need to be generated in the first matching flow table set. In this scenario, each port matching flow table optionally further includes direction information, and the direction information indicates the packet ingress direction. Each port matching flow table in the ingress direction includes the direction information, the identifier of the security group, and port matching information in the packet ingress direction. Since the security group does not include rules in a packet egress direction, packets in the egress direction all pass through or are all discarded. The SDN controller further needs to generate a flow table used for allowing all packets in the egress direction to pass through or for discarding the packets.

Scenario 3: The security group includes rules in a packet ingress direction and rules in a packet egress direction. Therefore, M port matching flow tables in the ingress direction and M port matching flow tables in the egress direction, that is, a total of 2M port matching flow tables need to be generated in the first matching flow table set. Each virtual machine port corresponds to one port matching flow table in the ingress direction and one port matching flow table in the egress direction. In this scenario, each port matching flow table optionally further includes direction information, and the direction information indicates the packet ingress direction or the packet egress direction. The port matching flow table in the ingress direction includes the direction information in the packet ingress direction, the identifier of the security group, and port matching information in the packet ingress direction. The port matching flow table in the egress direction includes the direction information in the packet egress direction, the identifier of the security group, and port matching information in the packet egress direction.

In the foregoing scenarios, common port matching information in the egress direction includes an identifier of a virtual machine port.

In the foregoing scenarios, common port matching information in the ingress direction includes a VXLAN network identifier (English full name: VXLAN network identifier, VNI for short) of a virtual machine port, a media access control (English full name: media access control, MAC for short) address corresponding to a virtual machine port, or a VLAN identifier (English full name: VLAN identifier, VID for short) and a MAC address corresponding to a virtual machine port. That is, the VNI and the MAC address are together used as the port matching information in the ingress direction, or the VID and the MAC address are together used as the port matching information in the ingress direction. Actually, a type of port matching information in the ingress direction and that in the egress direction are selected according to flow table design. The port matching information needs to distinguish different virtual machine ports.

Optionally, each port matching flow table further includes priority information of the security group.

The M virtual machine ports may be added to multiple security groups. Therefore, packets sent or received by the M virtual machine ports may successfully match multiple security groups. If the port matching flow table includes the priority information of the security group and the packet successfully matches the multiple security groups, the packet can be processed by using a packet action in an action flow table of a security group with a highest priority.

Optionally, each port matching flow table further includes connection tracking information of the security group, and the connection tracking information indicates that a packet successfully matching the port matching flow table belongs to a new session. Matching needs to be performed only for the packet of the new session. Adding the connection tracking information to the port matching flow table allows only the packet of the new session to match the first matching flow table set.

Step 404: The SDN controller generates a second matching flow table set, where the security group includes N rules, the second matching flow table set includes at least N rule matching flow tables corresponding to the N rules, each rule corresponds to at least one rule matching flow table, each rule matching flow table includes rule matching information and the identifier of the security group, and N is an integer greater than 0.

The SDN controller generates the second matching flow table set, and a flow table in the second matching flow table set is used for matching a rule in the security group, that is, for determining whether the packet can match at least one rule in the security group.

Optionally, the rule matching flow table further includes the priority information of the security group.

The M virtual machine ports may be added to multiple security groups. Therefore, packets sent or received by the M virtual machine ports may successfully match multiple security groups. If the rule matching flow table includes the priority information of the security group and the packet successfully matches the multiple security groups, the packet can be processed by using a packet action in an action flow table of a security group with a highest priority.

Optionally, the rule matching flow table further includes the direction information of the security group. If each rule includes direction information of the rule, that is, the rule is used to limit a packet in the egress direction or in the ingress direction, the rule matching flow table further needs to include the direction information.

The SDN controller accesses a preset database according to the identifier of the security group to obtain the N rules included in the security group. Each rule includes one or more matching conditions as follows: Ipv4 or Ipv6, a type of a used protocol (for example, the Transmission Control Protocol (English full name: Transmission Control Protocol, TCP for short), an IP prefix, or the like. The SDN controller generates the rule matching information according to the one or more matching conditions. Multiple pieces of rule matching information may be generated for one rule, and one rule may correspond to multiple rule matching flow tables. Therefore, a quantity of port matching flow tables in the second matching flow table set is greater than or equal to N.

It is common that if one rule in the security group includes a matching condition remote_group security group A, the matching condition indicates that all virtual machine ports in a security group A match the rule. If the rule is a rule in the packet egress direction, remote_group security group A indicates that a packet whose destination virtual machine port belongs to the security group A matches the rule. If the rule is a rule in the packet ingress direction, remote_group security group A indicates that a packet whose source virtual machine port belongs to the security group A matches the rule.

If both a virtual machine port 1 (whose address is 192.168.10.1) and a virtual machine port 2 (whose address is 192.168.10.2) belong to the security group A and the rule is a rule in the packet egress direction, the rule corresponds to two rule matching flow tables, which respectively include rule matching information nw_dst=192.168.10.1 and nw_dst=192.168.10.2. If more virtual machine ports belong to the security group A, the security group A may correspond to more rule matching flow tables.

Rules of other types may correspond to multiple rule matching flow tables. For example, a rule indicates a matching condition for consecutive port ranges, for example, TCP ports 8000-8100 are specified in the matching condition. If rule matching information uses a manner of an address prefix and a mask to describe the matching condition, for example, tcp_dst=0x1f40/0xff00, one group of address prefix and mask may not be able to describe the matching condition. Therefore, multiple pieces of rule matching information are required to describe the matching condition, that is, the rule corresponds to multiple rule matching flow tables.

Optionally, each port matching flow table further includes a first connection identifier, the first connection identifier is used to indicate that security group matching of the packet includes two parts, and a first part of security group matching of the packet is completed when the packet matches any port matching flow table in the first matching flow table set.

Each rule matching flow table further includes a second connection identifier, the second connection identifier is used to indicate that security group matching of the packet includes two parts, and a second part of security group matching of the packet is completed when the packet matches any rule matching flow table in the second matching flow table set.

Security group matching is split into two parts in this embodiment of the present invention, and the two parts are separately implemented by using the first matching flow table set and the second matching flow table. Therefore, the two parts need to be connected by using the connection identifiers. Each connection identifier includes two pieces of information: currently which part security group matching is in and how many parts in total. For example, the first connection identifier "1/2" indicates that currently security group matching is in the first part and there are a total of two parts; the second connection identifier "2/2" indicates that currently security group matching is in the second part and there are a total of two parts. The first connection identifier and the second connection identifier enable a switching device to determine whether the packet can match a flow table of each part that is obtained through splitting when the switching device matches the packet with the security group.

Step 406: The SDN controller generates an action flow table of the security group, where the action flow table of the security group includes the identifier of the security group and a packet action, the packet action indicates an operation that is executed after a packet successfully matches the security group, and that a packet successfully matches the security group includes: the packet matches any port matching flow table in the first matching flow table set, and matches any rule matching flow table in the second matching flow table set.

The packet matches any port matching flow table in the first matching flow table set, that is, port matching information of a virtual machine port that sends the packet or port matching information of a destination virtual machine port of the packet matches the port matching information in the at least one port matching flow table in the first matching flow table set. The packet matches any rule matching flow table in the second matching flow table set, that is, a protocol type used by the packet, IP information, and the like match the rule matching information of the at least one rule matching flow table in the second matching flow table set.

If the packet matches any port matching flow table in the first matching flow table set, and matches any rule matching flow table in the second matching flow table set, the packet successfully matches the security group.

Optionally, the action flow table of the security group further includes the direction information. In this case, the SDN controller generates two action flow tables of the security group in step 406, and the two action flow tables respectively include the direction information in the packet egress direction, the identifier of the security group, a packet action in the packet egress direction, and the direction information in the packet ingress direction, the identifier of the security group, a packet action in the packet ingress direction.

It should be noted that there is no sequence limit on steps 402, 404, and 406, and they can be performed in any sequence or concurrently.

Step 408: The SDN controller sends the first matching flow table set, the second matching flow table set, and the action flow table of the security group to the switching device.

The SDN controller sends the generated first matching flow table set, the generated second matching flow table set, and the generated action flow table of the security group to the switching device, so that the switching device can process the received packet according to an indication of the flow table. The switching device may include one or more virtual switches.

The following description uses FIG. 5A and FIG. 5B and FIG. 5C as an example to describe a structure of a flow table. In actual practice, a structure of a flow table may be different from the structure of the flow table shown in FIG. 5A and FIG. 5B and FIG. 5C, and names of fields may be customized according to requirements. sgA indicates the security group A.

In a packet egress direction:
table=$sg_egress_table in a port matching flow table is direction information indicating the packet egress direction. priority=$sgA_priority is priority information of the security group A. in_port=$ vm1_port is port matching information in the egress direction and indicates that a vm1_port belongs to the security group A. Therefore, a packet sent by the vm1_port can match the flow matching flow table. ct_state=+trk+new is connection tracking information and used to indicate that only a packet of a new session can successfully match the port matching flow table. $sgA_conj_id in actions=conjunction ($sgA_conj_id, 1/2) is an identifier of the security group A and 1/2 is a first connection identifier. The action instructs to record $sgA_conj_id and 1/2 if the packet successfully matches the port matching flow table.

Rule 1: egress, ipv4, 22/tcp, remote_group:sgA is one of rules in the security group A. egress indicates that the rule is for a packet in the egress direction. ipv4, 22/tcp, remote_group:sgA is a matching condition of the rule 1. The rule 1 corresponds to table$=sg_egress_table in a rule matching flow table. Two fields in priority=$sgA_priority are similar to those in the port matching flow table, and details are not repeated. ip, nw_proto=6, tcp_dst=22, nw_dst=$vm1_fixed_ip is rule matching information in the rule matching flow table. remote_group:sgA in the matching condition instructs to aggregate addresses of all virtual machine ports associated with the security group A and use the aggregated addresses as the rule matching information. Because the security group A is associated only with the VM1 port in the example shown in FIG. 5A and FIG. 5B and FIG. 5C the rule matching information includes an IP address, that is vm1_fixed_ip, of the VM1 port. 2/2 in actions=conjunction ($sgA_conj_id, 2/2) is a second connection identifier. The action instructs to record $sgA_conj_id and 2/2 if the packet successfully matches the rule matching flow table.

conj_id=$sgA_conj_id in an action flow table 1 in the packet egress direction is used to indicate the security group A. If the switching device records $sgA_conj_id and 1/2 when processing the packet, and records $sgA_conj_id and 2/2, it indicates that the packet successfully matches the security group A. The switching device may obtain the action flow table of the security group A by using conj_id=$sgA_conj_id, and processes the packet according to actions=ct(commit, zone=NXM_NX_CT_ZONE[ ], table=$next_process_table). An action in the action flow table 1 in the packet egress direction instructs to execute a next flow table. An action in the action flow table 2 in the packet egress direction instructs to send the packet from one port. In actual practice, there may be multiple types of packet actions indicated by the action in the action flow table. One action flow table is usually set for one security group. Packets successfully matching the security group will execute the packet action in the action flow table.

In a packet ingress direction:

For main details, refer to description of the flow table in the packet egress direction. A main difference is that direction information table=$sg_igress_table in the packet ingress direction is included. In addition, port matching information in a port matching flow table is the port matching information in the ingress direction described above, that is, tun_id=2000 and dl_mac=11:22:33:44:55:66. They are respectively a VNI and a MAC address of a destination virtual machine port of the packet.

Optionally, the flow table processing method further includes: The SDN controller receives a message indicating that a new virtual machine port is added to the security group. The new virtual machine port is an $(M+1)^{th}$ virtual machine port that is added to the security group. The SDN controller generates a port matching flow table corresponding to the new virtual machine port. The SDN controller sends the port matching flow table corresponding to the new virtual machine port to the switching device.

The port matching flow table corresponding to the new virtual machine port includes port matching information of the new virtual machine port and the identifier of the security group.

The SDN controller records information about previously adding virtual machine ports to security groups. If the SDN controller receives a message indicating that a new virtual machine port is added to the security group A, the SDN controller finds that the SDN controller has recorded information about previously adding a virtual machine port to the security group A, and a port matching flow table, a rule matching flow table, and an action flow table of the security group A that were generated when the virtual machine port was previously added to the security group A have been sent to the switching device, the SDN controller does not need to generate the rule matching flow table and the action flow table of the security group A, but only needs to generate the port matching flow table corresponding to the new virtual machine port, and send the port matching flow table to the switching device.

Optionally, the security group includes a rule in the packet ingress direction and a rule in the packet egress direction, and the port matching flow table corresponding to the new virtual machine port further includes the direction information. In this case, the SDN controller generates two port matching flow tables corresponding to the new virtual machine port, and the two port matching flow tables respectively include the direction information in the packet egress direction, the identifier of the security group, port matching information in the packet egress direction of the new virtual machine port, and the direction information in the packet ingress direction, the identifier of the security group, port matching information in the packet ingress direction of the new virtual machine port.

By means of the flow table processing method provided in this application, in a scenario in which the new virtual machine port is added to the security group, a process of generating a flow table and subsequent matching is simpler, and a smaller quantity of flow tables may be used to implement adding the new virtual machine port to the security group. Compared with the prior art in which at least N flow tables need to be generated, the flow table processing method improves working efficiency of the SDN controller.

Optionally, the SDN controller receives a message indicating that a new rule is added to the security group. The new rule is an $(N+1)^{th}$ rule of the security group. The SDN controller generates a rule matching flow table corresponding to the new rule, and sends the rule matching flow table corresponding to the new rule to the switching device.

The rule matching flow table corresponding to the new rule includes new rule matching information and the identifier of the security group. The new rule matching information corresponds to the new rule.

The SDN controller receives a message indicating that a new rule is added to the security group A. Because a rule matching flow table corresponding to a previous rule of the security group A has been sent to the switching device, the SDN controller only needs to generate a rule matching flow table corresponding to the new rule and send the rule matching flow table to the switching device. The new rule may correspond to multiple pieces of rule matching information. Therefore, a quantity of rule matching flow tables corresponding to the new rule and generated by the SDN controller is greater than or equal to 1.

By means of the flow table processing method provided in this application, in a scenario in which the new rule is added to the security group, a process of generating a flow table and subsequent matching is simpler, and a smaller quantity of flow tables may be used to implement adding the new rule to the security group. Compared with the prior art in which at least M flow tables need to be generated, the flow table processing method improves working efficiency of the SDN controller.

The flow table processing method provided above lowers complexity of a flow table used to implement matching between a packet and a security group, improves efficiency in generating and using the flow table used to implement matching between the packet and the security group, reduces a quantity of flow tables that need to be generated by an SDN controller when a virtual machine port is added to the security group, and lightens working load of the SDN controller and transmission load between the SDN controller and a switching device.

Figure 4:
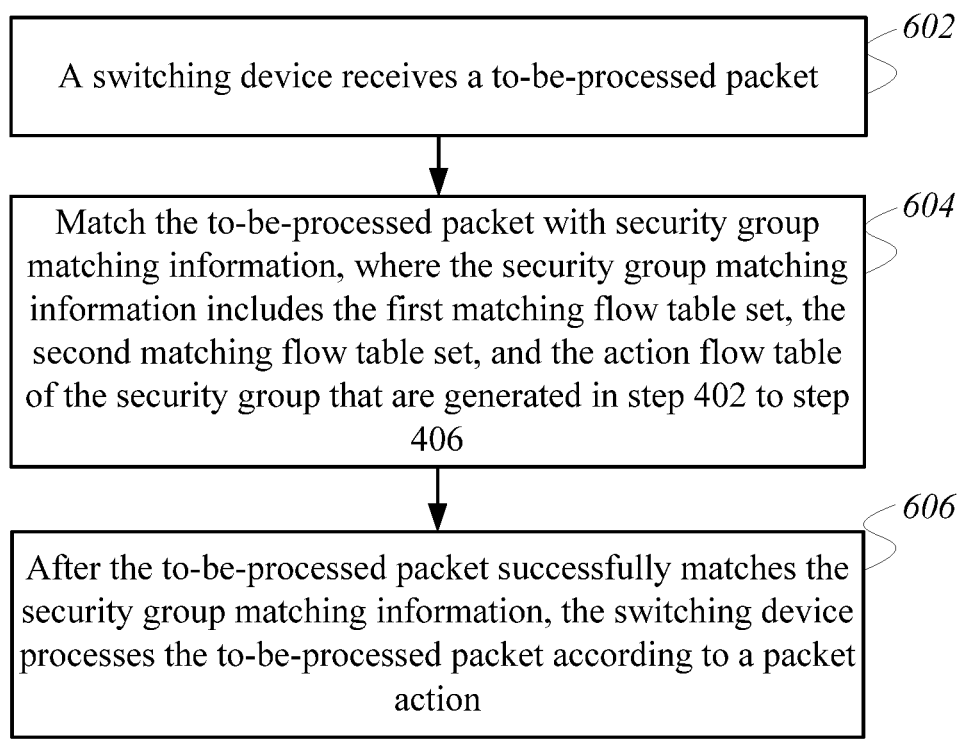
FIG. 4 is a schematic flowchart of a packet processing method according to an embodiment of this application.

An embodiment of this application provides a packet processing method. The packet processing method is executed when a node on which a switching device is deployed in FIG. 1a to FIG. 1c is running. FIG. 4 shows a schematic flowchart of the packet processing method.

Step 602: The switching device receives a to-be-processed packet.

Step 604: The switching device matches the to-be-processed packet with security group matching information.

The security group matching information includes: a first matching flow table set, a second matching flow table set, and an action flow table of a security group. M virtual machine ports are added to the security group. The security group includes N rules, and M and N each are an integer greater than 0. The first matching flow table set includes at least M port matching flow tables corresponding to the M virtual machine ports, each virtual machine port corresponds to at least one port matching flow table, and each port matching flow table includes port matching information and an identifier of the security group. The second matching flow table set includes at least N rule matching flow tables corresponding to the N rules, each rule corresponds to at least one rule matching flow table, and each rule matching flow table includes rule matching information and the identifier of the security group. The action flow table of the security group includes the identifier of the security group and a packet action, and the packet action indicates an operation that is executed after a packet successfully matches the security group. That a packet successfully matches the security group includes: The packet matches any port matching flow table in the first matching flow table set, and matches any rule matching flow table in the second matching flow table set.

The security group matching information includes the first matching flow table set, the second matching flow table set, and the action flow table of the security group that are generated in step 402 to step 406 and their optional solutions.

The packet processing method is used with the flow table processing method shown in FIG. 3. The node that executes the packet processing method and the node that executes the flow table processing method belong to a same SDN. The switching device in step 602 receives the first matching flow table set, the second matching flow table set, and the action flow table of the security group that are generated by the SDN controller in the flow table processing method shown in FIG. 3. For implementation details and optional flow table contents, refer to the flow table processing method corresponding to the FIG. 3.

Optionally, referring to the flow table processing method shown in FIG. 3, each port matching flow table further includes a first connection identifier and each rule matching flow table further includes a second connection identifier.

After obtaining the to-be-processed packet and determining that the to-be-processed packet matches any port matching flow table in the first matching flow table set, the switching device records the identifier of the security group and the first connection identifier, as shown by $sgA_conj_id and 1/2 in the port matching flow table in FIG. 5A and FIG. 5B and FIG. 5C. After determining that the to-be-processed packet matches any rule matching flow table in the second matching flow table set, the switching device records the identifier of the security group and the second connection identifier, as shown by $sgA_conj_id and 2/2 in the rule matching flow table in FIG. 5A and FIG. 5B and FIG. 5C.

The switching device determines, according to the recorded $sgA_conj_id and 1/2, and the recorded $sgA_conj_id and 2/2, that the to-be-processed packet successfully matches a security group A.

Security group matching is split into two parts in this embodiment of the present invention. The port matching flow table or the rule matching flow table obtained through splitting has only one matching field. Therefore, a process of matching the to-be-processed packet with the security group matching information by the switching device is simpler. In addition, compared with the prior art in which M*N flow tables need to be matched, in this embodiment of the present invention, M+N or 2M+N flow tables need to be matched. This reduces a quantity of flow tables to be matched, lightens working load of the switching device, and increases a speed of matching the to-be-processed packet with the security group.

Optionally, each port matching flow table in the first matching flow table set further includes direction information. Port matching information in a packet egress direction may be an identifier of a virtual machine port. After receiving a to-be-processed packet in the egress direction, the switching device obtains an identifier of a virtual machine port of the to-be-processed packet in the egress direction, where the identifier is used for matching a port matching flow table in the egress direction. In an example in which port matching information in a packet ingress direction is a VNI and a MAC address, after receiving a to-be-processed packet in the ingress direction, the switching device obtains a VNI and a MAC address of a destination virtual machine port of the packet according to information carried in the packet, where the VNI and the MAC address are used for matching a port matching flow table in the ingress direction.

The to-be-processed packet further carries information such as a protocol type used by the to-be-processed packet, and a destination IP address. The switching device matches the to-be-processed packet with the rule matching information in the rule matching flow table according to the information.

Step 606: After the to-be-processed packet successfully matches the security group, the switching device processes the to-be-processed packet according to the packet action.

Optionally, before performing step 602, the switching device further receives the security group matching information. The security group matching information is sent by the SDN controller to the switching device. The switching device may perform step 602 to step 606 multiple times after receiving the security group matching information once.

After determining that the to-be-processed packet successfully matches the security group A, the switching device obtains an action flow table of the security group by using an identifier $sgA_conj_id of the security group, that is, the action flow table including conj_id=$sgA_conj_id, and processes the to-be-processed packet according to a packet action in the action flow table.

Optionally, the action flow table of the security group further includes the direction information. In this case, two action flow tables of the security group are received in step 602, and the two action flow tables respectively include the direction information in the packet egress direction, the identifier of the security group, a packet action in the packet egress direction, and the direction information in the packet ingress direction, the identifier of the security group, a packet action in the packet ingress direction. After determining that the to-be-processed packet successfully matches the security group A, the switching device processes the to-be-processed packet according to the packet action in the packet egress direction if the to-be-processed packet is in the egress direction, and processes the to-be-processed packet according to the packet action in the packet ingress direction if the to-be-processed packet is in the ingress direction.

In the packet processing method provided above, a switching device uses a first matching flow table set and a second matching flow table set to match a packet with a security group, and uses an action flow table to implement a packet action successfully matching the security group. This lowers complexity of a security group matching process, reduces a quantity of flow tables to be matched when the switching device processes a to-be-processed packet, and improves working efficiency of the switching device.

This application further provides a flow table processing apparatus 800. The apparatus may serve as a network node in an SDN architecture. The apparatus may be implemented by the computing device 200 shown in FIG. 2, or by an application-specific integrated circuit (English: application-specific integrated circuit, ASIC for short), or by a programmable logic device (English: programmable logic device, PLD for short). The PLD may be a complex programmable logic device (English: complex programmable logic device, CPLD for short), an FPGA, a generic array logic (English: generic array logic, GAL for short), or any combination thereof. The flow table processing apparatus 800 is configured to implement the flow table processing method shown in FIG. 3. If the flow table processing method shown in FIG. 3 is implemented by means of software, the flow table processing apparatus 800 and its modules may be software modules, such as a software module implementing an SDN controller.

Figure 6:
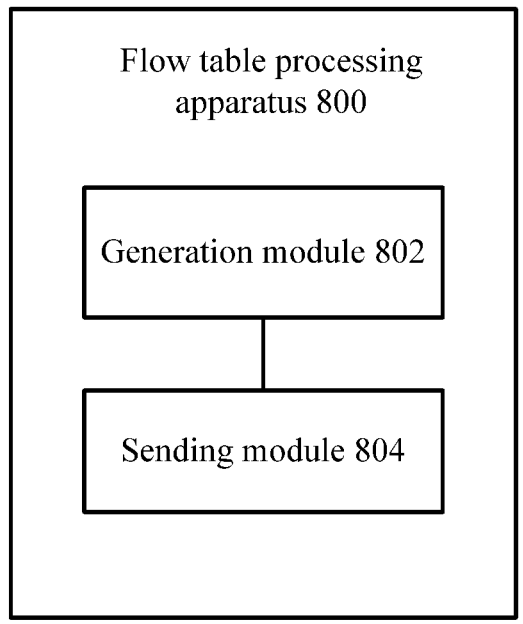
FIG. 6 is a schematic diagram of a composition structure of a flow table processing apparatus according to an embodiment of this application.

FIG. 6 shows a schematic diagram of a composition structure of the flow table processing apparatus 800, including a generation module 802 and a sending module 804. When the generation module 802 is operating, it performs step 402, step 404, step 406, and various optional solutions in the flow table processing method shown in FIG. 3. When the sending module 804 is operating, it performs step 408 in the flow table processing method shown in FIG. 3.

The flow table processing apparatus provided above lowers complexity of a flow table used to implement matching between a packet and a security group, improves efficiency in generating and using the flow table used to implement matching between the packet and the security group, reduces a quantity of flow tables that need to be generated by an SDN controller when a virtual machine port is added to the security group, and lightens working load of the flow table processing apparatus and transmission load between the flow table processing apparatus and a switching device.

An embodiment of the present invention further provides a packet processing apparatus 1000. The apparatus may serve as a computing node in an SDN architecture. The apparatus may be implemented by the computing device 200 shown in FIG. 4, or by an ASIC, or by a PLD. The PLD may be a complex programmable CPLD, an FPGA, a GAL, or any combination thereof. The packet processing apparatus 1000 is configured to implement a mirror deployment method shown in FIG. 8. If the packet processing method shown in FIG. 4 is implemented by means of software, the packet processing apparatus 1000 and its modules may be software modules, such as a software module implementing a virtual switch.

Figure 7:
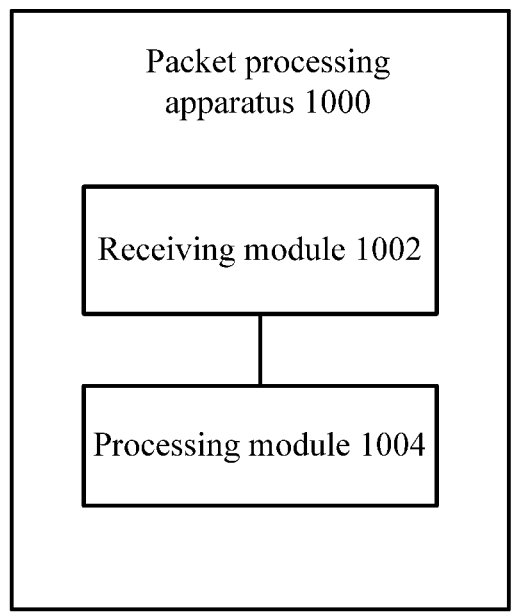
FIG. 7 is a schematic diagram of a composition structure of a packet processing apparatus according to an embodiment of this application.

FIG. 7 shows a schematic diagram of a composition structure of the packet processing apparatus 1000, including a receiving module 1002 and a processing module 1004. When the receiving module 1002 is operating, it performs step 602 and an action of obtaining security group matching information before step 602 in the packet processing method shown in FIG. 4. When the processing module 1004 is operating, it performs step 604 and step 606 in the packet processing method shown in FIG. 4.

According to the packet processing apparatus provided above, a first matching flow table set and a second matching flow table set are used to match a packet with a security group, and an action flow table is used to implement a packet action successfully matching the security group. This lowers complexity of a security group matching process, reduces a quantity of flow tables to be matched when a switching device processes a to-be-processed packet, and improves working efficiency of the switching device.

In the foregoing embodiments, the description of each embodiment has respective focuses. For a part that is not described in detail in an embodiment, reference may be made to related descriptions in other embodiments. Implementation details of the flow table processing method shown in FIG. 3 may be applied to the flow table processing apparatus 800. Implementation details of the packet processing method shown in FIG. 4 may be applied to the packet processing apparatus 1000.

The methods with reference to disclosure of this application may be implemented by using a processor to execute software instructions. The software instructions may include corresponding software modules. The software modules may be placed in an RAM, a flash memory, a ROM, an erasable programmable read only memory (English: erasable programmable read only memory, EPROM for short), an electrically erasable programmable read only memory (English: electrically erasable programmable read only memory, EEPROM for short), a hard disk, an optical disc, or any other form of storage medium known by those skilled in the art.

Persons skilled in the art should may realize that functions described in this application may be implemented by means of hardware or software in the foregoing one or more examples. When this application is implemented by software, the foregoing functions may be stored in a computer-readable medium or transmitted as one or more instructions or code in the computer-readable medium. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A method performed by a software-defined networking (SDN) comprising a controller and a switching device, comprising:
    generating, by the controller, a first matching flow table set of a security group that includes M virtual machine ports, the first matching flow table set comprises at least M port matching flow tables corresponding to the M virtual machine ports, each of the M port matching flow tables including port matching information and an identifier of the security group, and M is an integer greater than 0;
    sending, by the controller, the first matching flow table set to the switching device;
    generating, by the controller, a second matching flow table set that comprises N rules and at least N rule matching flow tables corresponding to the N rules, each of the N rule matching flow tables including rule matching information and the identifier of the security group, and N is an integer greater than 0;
    sending, by the controller, the second matching flow table set to the switching device;
    generating, by the controller, an action flow table of the security group, wherein the action flow table of the security group comprises the identifier of the security group and a packet action based on a packet matching any port matching flow table in the first matching flow table set, and matching any rule matching flow table in the second matching flow table set; and
    sending, by the controller, the action flow table of the security group to the switching device;
    wherein each port matching flow table further comprises a first connection identifier, the first connection identifier is used to indicate that security group matching of the packet comprises two parts, and a first part of security group matching of the packet is completed when the packet matches any port matching flow table in the first matching flow table set; and
    each rule matching flow table further comprises a second connection identifier, the second connection identifier is used to indicate that security group matching of the packet comprises two parts, and a second part of security group matching of the packet is completed when the packet matches any rule matching flow table in the second matching flow table set;
    receiving, by the switching device, packet for processing;
    matching, by the switching device, the packet with a flow table in the first matching flow table set;
    determining, by the switching device, that the packet successfully matches any port matching flow table in the first matching flow table set, and recording the first connection identifier;
    matching, by the switching device, the packet with a flow table in the second matching flow table set;
    determining, by the switching device, that the packet successfully matches any rule matching flow table in the second matching flow table set, and recording the second connection identifier; and
    processing, by the switching device, the packet according to the packet action according to the recorded first connection identifier and second connection identifier.

2. The method according to claim 1, generating the first matching flow table set of the security group comprises:
    separately generating, by the controller, the port matching flow tables according to an obtained message indicating that the M virtual machine ports are added to the security group.

3. The method according to claim 1, further comprising:
    receiving, by the controller, a message indicating that a new virtual machine port is added to the security group;
    generating, by the controller, a port matching flow table corresponding to the new virtual machine port; and
    sending, by the controller, the port matching flow table corresponding to the new virtual machine port to the switching device.

4. The method according to claim 1, further comprising:
    receiving, by the controller, a message indicating that a new rule is added to the security group;
    generating, by the controller, a rule matching flow table corresponding to the new rule; and
    sending, by the controller, the rule matching flow table corresponding to the new rule to the switching device.

5. An SDN, comprising a controller with a first processor and a first memory and a switching device with a second processor and a second memory;
    the first processor is configured to read a program storing in the first memory to perform:
        generating a first matching flow table set of a security group that includes M virtual machine ports, the first matching flow table set comprises at least M port matching flow tables corresponding to the M virtual machine ports, each of the M port matching flow tables including port matching information and an identifier of the security group, and M is an integer greater than 0;
        sending the first matching flow table set to a switching device;
        generating a second matching flow table set that comprises N rules and at least N rule matching flow tables corresponding to the N rules, each of the N rule matching flow tables including rule matching information and the identifier of the security group, and N is an integer greater than 0;
        sending the second matching flow table set to the switching device;
        generating an action flow table of the security group, wherein the action flow table of the security group comprises the identifier of the security group and a packet action based on a packet matching any port matching flow table in the first matching flow table set, and matching any rule matching flow table in the second matching flow table set; and
        sending the action flow table of the security group to the switching device;
        wherein each port matching flow table further comprises a first connection identifier, the first connection identifier is used to indicate that security group matching of the packet comprises two parts, and a first part of security group matching of the packet is completed when the packet matches any port matching flow table in the first matching flow table set; and
        each rule matching flow table further comprises a second connection identifier, the second connection identifier is used to indicate that security group matching of the packet comprises two parts, and a second part of security group matching of the packet is completed when the packet matches any rule matching flow table in the second matching flow table set;
the second processor is configured to read a program storing in the second memory to perform:
receiving packet for processing;
matching the packet with a flow table in the first matching flow table set;
determining that the packet successfully matches any port matching flow table in the first matching flow table set, and recording the first connection identifier;
matching the packet with a flow table in the second matching flow table set;
determining that the packet successfully matches any rule matching flow table in the second matching flow table set, and recording the second connection identifier; and
processing the to-be-processed packet according to the packet action according to the recorded first connection identifier and second connection identifier.

* * * * *